W. J. FOSTER.
METHOD OF AND MEANS FOR OPERATING SYNCHRONOUS DYNAMO ELECTRIC MACHINES.
APPLICATION FILED AUG. 30, 1913.
1,160,705.
Patented Nov. 16, 1915.
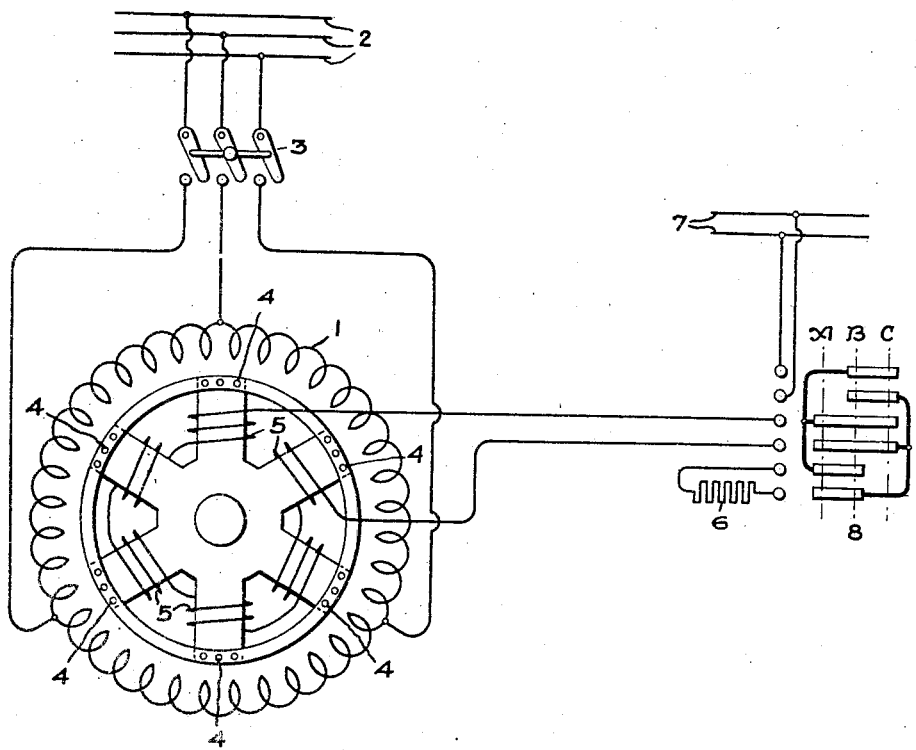
WITNESSES:
INVENTOR:
WILLIAM J. FOSTER,
BY
HIS ATTORNEY.

UNITED STATES PATENT OFFICE.

WILLIAM J. FOSTER, OF SCHENECTADY, NEW YORK, ASSIGNOR TO GENERAL ELECTRIC COMPANY, A CORPORATION OF NEW YORK.

METHOD OF AND MEANS FOR OPERATING SYNCHRONOUS DYNAMO-ELECTRIC MACHINES.

1,160,705.   Specification of Letters Patent.   Patented Nov. 16, 1915.

Application filed August 30, 1913.   Serial No. 787,465.

*To all whom it may concern:*

Be it known that I, WILLIAM J. FOSTER, a citizen of the United States, residing at Schenectady, county of Schenectady, State of New York, have invented certain new and useful Improvements in Methods of and Means for Operating Synchronous Dynamo-Electric Machines, of which the following is a specification.

My invention relates to synchronous dynamo electric machines, and particularly to the operation of such machines during the starting period.

It is well known that a synchronous motor or a rotary converter will have a high starting torque with a minimum current input when it is started as an induction motor, but such a machine will have a large slip, and unless the load thereon is small it will not pull into synchronism.

My invention has for its object a novel method of and means for operating such a dynamo electric machine, or any synchronous machine, so that its speed will approach more nearly to that of synchronism than would be the case if it were started as a simple induction motor. To this end, I start the machine by supplying alternating current to its alternating current winding so that it will start as an alternating current induction motor. The machine may have a short-circuited secondary winding or may be provided with poles of solid steel. In the latter case the machine will operate substantially the same as if it were provided with a short-circuited secondary winding. I preferably provide the machine with a short-circuited secondary winding in addition to a direct current exciting winding. After the machine has started as an induction motor I short circuit the direct current exciting winding of the machine on a resistance, which brings the speed of the machine closer to synchronism with a high torque and with a comparatively small current input. The source of direct current is then connected to the direct current exciting winding and the machine pulls into synchronism. I preferably connect the source of direct current to the direct current exciting winding and the resistance which short-circuits this exciting winding in parallel without opening the circuit of the direct current exciting winding, whereby the transition from induction motor operation to synchronous motor operation is made with minimum line disturbance, due to the fact that there is no danger of the motor dropping in speed during the transition.

For a better understanding of my invention reference may be had to the following description taken in connection with the accompanying drawing, in which the single figure shows diagrammatically one embodiment of my invention.

Referring to the drawing, 1 is an alternating current winding of a synchronous dynamo electric machine which is arranged to be connected to alternating current mains 2 in any well known manner. Any well known form of compensator may be used, or a switch 3 may be used for this purpose.

4 is a short-circuited secondary winding which may be of comparatively high resistance, and 5 a direct current exciting winding, both of which are on the field member, which I have shown as being the rotary member of the machine. A resistance 6 is provided on which the direct current exciting winding is short-circuited during the starting operation as will hereinafter appear. Direct current mains 7 are provided for supplying current to the exciting winding 5. A control switch 8 is shown for making these connections.

The machine is started by supplying alternating current to the winding 1 of the machine, whereupon it will operate as an induction motor with the short-circuited winding 4 performing the function of a secondary. When the motor reaches the maximum speed that it can as an induction motor with the single short-circuited winding 4, the control switch 8 is thrown into position A, whereupon the direct current exciting winding is short-circuited on resistance 6. The machine now operates as an induction motor with two short-circuited windings and consequently its speed will increase and approach more nearly to synchronism. The control switch is then thrown into position B, whereupon direct current will be supplied from the direct current mains 7 to the exciting winding 5 and the motor will now pull into synchronism and operate at synchronous speed. With the particular arrangement of controller contacts shown in the drawing, the winding 5 and resistance 6 are connected in parallel across the direct current mains in one position of the controller, but as the resistance 6 is higher in value than the resistance of the winding 5, no harm will be done. Furthermore this position of the controller is only a transition step and it is immediately moved to the running position C, in which the resistance is disconnected and the direct current mains are connected to the exciting winding only. The provision of the transition position B on the controller permits the change from induction motor operation to synchronous motor operation to be made without opening the circuit of the winding 5. With this arrangement of the controller, there is no danger of the machine dropping in speed during the transition and there will be therefore no disturbance on the lines 2.

I desire it to be understood that my invention is not limited to the particular arrangement shown and described, and aim in the appended claims to cover all modifications which do not depart from the spirit and scope of my invention.

What I claim as new and desire to secure by Letters Patent of the United States, is:—

1. The method of operating a synchronous dynamo electric machine provided with an alternating current winding on one member and a direct current exciting winding on its field member, which consists in supplying alternating current to its alternating current winding to start the machine as an alternating current motor having a short-circuited secondary winding, then short-circuiting its direct current exciting winding on a resistance to supply the machine with a second short-circuited winding, and then supplying direct current to the exciting winding and the resistance in parallel to pull the machine into synchronism.

2. The method of operating a synchronous dynamo electric machine provided with an alternating current winding on one member and a direct current exciting winding on its field member, which consists in supplying alternating current to its alternating current winding to start the machine as an alternating current motor having a short-circuited secondary winding, then short-circuiting its direct current exciting winding on a resistance to supply the machine with a second short-circuited winding, then supplying direct current to the exciting winding and the resistance in parallel to pull the machine into synchronism, and then disconnecting the resistance.

3. In combination, a synchronous dynamo electric machine having a member provided with a short-circuited winding and a direct current exciting winding, a source of direct current, a resistance, and means for closing said exciting winding on said resistance and for connecting said source to said exciting winding and the resistance in parallel.

4. In combination, a synchronous dynamo electric machine having a member provided with a short-circuited winding and a direct current exciting winding, a source of direct current, a resistance, and means for closing said exciting winding on said resistance, for connecting said source to said exciting winding and said resistance in parallel, and for disconnecting said resistance.

In witness whereof, I have hereunto set my hand this 29th day of August, 1913.

WILLIAM J. FOSTER.

Witnesses:
BENJAMIN B. HULL,
MARGARET E. WOOLLEY.